(12) United States Patent
Dilger

(10) Patent No.: US 6,191,574 B1
(45) Date of Patent: Feb. 20, 2001

(54) BOW-MOUNTED APPARATUS FOR DETECTION AND QUANTIFICATION OF DEVIATIONS IN DYNAMIC ARROW POSITION

(76) Inventor: John Patrick Dilger, 2703 275th St., Marshalltown, IA (US) 50158

(*) Notice: Under 35 U.S.C. 154(b), the term of this patent shall be extended for 0 days.

(21) Appl. No.: 09/008,988

(22) Filed: Jan. 20, 1998

Related U.S. Application Data

(63) Continuation-in-part of application No. 09/009,030, filed on Jan. 20, 1998.
(51) Int. Cl.[7] .................................. G01P 3/66; F41B 5/14
(52) U.S. Cl. ........................... 324/178; 702/150; 124/87; 250/215; 33/265
(58) Field of Search ................................. 324/178, 179, 324/244.1; 702/142, 150; 124/35.2, 87; 250/215; 33/265

(56) References Cited

U.S. PATENT DOCUMENTS

| | | | |
|---|---|---|---|
| 3,401,334 | 9/1968 | Bell | 324/178 |
| 4,179,613 | 12/1979 | Koren | 250/215 |
| 4,574,238 | * 3/1986 | Weinlich | 324/178 |

OTHER PUBLICATIONS

Competition Electronics catalog for ProChrono Plus Insutrctions Date unavailable.

1997 The Complete Hunter—Bowhunting Equipment Skills catalog, p. 109–115.

* cited by examiner

*Primary Examiner*—Jay Patidar

(57) ABSTRACT

An apparatus for quantifying the position of a released arrow as it passes across the bow riser. A low power, electronics measurement unit attached onto or mounted internal to a bow in communication with a sensor detects a signal from an arrow shaft for the purposes of collecting data pertaining to arrow position. The electronics measurement unit provides a user configurable gain to control the variation and sensitivity of the collected data. The optical trigger mechanism used to stimulate the sensor does not require arrow shaft modification. Statistical parameters of the collected data are displayed on the bow and are used to determine and improve archery tackle performance.

8 Claims, 13 Drawing Sheets

BOW-MOUNTED APPARATUS FOR DETECTION AND QUANTIFICATION OF DEVIATIONS IN DYNAMIC ARROW POSITION

This is a continuation-in-part of a Utility Patent Application filed Jan. 20, 1998 via U.S. Express Mail, Mail Express label # EI583365813U.S. Ser. No. 09/009,030.

FIELD OF THE INVENTION

This invention relates to archery equipment, specifically to an improved method of detecting and quantifying deviations in dynamic arrow position on a bow riser.

BACKGROUND

In general, the archer and the archery tackle, that is the bow, arrow, release mechanism, arrow rest, and bow sight, are viewed as a bow system. With respect to archery physics, bow system consistency is the fundamental component in highly accurate shooting. Measuring arrow dynamics in the bow system is a superior way to detect and improve performance. As those skilled in the art are filly aware, minute deviations in archery tackle setup or variations in hand position during arrow release degrade bow system accuracy. When an arrow is released from the bow system, vertical and horizontal bending moments are always induced in the arrow shaft. The trajectory of an arrow is dynamically stable and contains damped sinusoidal bending moments or oscillations in both vertical and horizontal planes along the longitudinal axis of the arrow. These oscillations occur due to asymmetric forces exerted upon on the bow string which thereby imparts comparable forces on the arrow. Any force exerted upon the arrow shaft that causes position deviations during arrow flight increases the size of the arrow impact area or produces larger arrow groups. A properly tuned bow system will minimize these asymmetric forces. Therefore, at a given distance, a properly tuned bow system, a combination of both archer and archery tackle, will produce minimal arrow group geometry.

One such example of accuracy degradation would pertain to the stiffness of the arrow or arrow spine. For any bow system, improperly spined arrows will produce horizontal oscillations with increasing amplitude; thus increasing arrow group width and reducing bow system accuracy. These horizontal oscillations can occur from arrows that are either too stiff or too flexible. Another example of an improperly tuned bow system would relate to arrow position on the bow string. An arrow is coupled to the bow string with an arrow nock that mechanically grips the string. Reproducible arrow placement upon the bow string is achieved with a nock set. The nock set is a device the archer permanently attaches to the bow string that enables the archer to place the arrow nock at the same point on the bow string each time an arrow is to be released. If the nock set is placed too high or too low, tremendous vertical oscillations will result, thus producing vertical elongation of the arrow group and reducing bow system accuracy. Yet another example is the improperly timed cams on a compound bow. Compound bows are characterized by a wheel and cable system integral to the limbs of the bow. As the bow is drawn, the wheel and cable system provides a mechanical advantage or leverage on the bow limbs; thus reducing the force required to hold the limbs at full draw by as much as 70%. As I understand it, a compound bow is synchronized when both wheels rotate an equal number of degrees at full draw. If the wheels are not synchronized, an effect very similar to an improper nock set location is realized. Arrow groups will elongate and decrease the accuracy of the bow system.

Previously, archery tackle performance was primarily determined by measuring arrow velocity in close proximity to the bow system or measuring arrow group geometry of the target face. Prior Art illustrates that arrow velocity was determined by placing a complex mechanical apparatus adjacent to a stationary target. One such invention is described in U.S. Pat. No. 3,401,334. To measure arrow velocity, a moveable target released from the apparatus would fall in the arrow path down the surface of the stationary target. As the arrow strikes the stationary target, the moving target is pinned to the stationary target. By knowing the moveable target's relationship with respect to gravity, the measured distance it fell, and the distance the arrow traveled, arrow velocity could be calculated. With consideration to determining archery tackle performance, this method is inaccurate since the falling target must be released at the precise moment the arrow is loosed from the bow. Any attempt to couple an electromechanical triggering device to the bow limb changes shot dynamics and will not deliver actual bow system performance. Additionally, critical data with respect to arrow motion or position at the moment of arrow release has dissipated significantly if the measurement apparatus is not intimately coupled to the bow.

As the state of the art in electronics advanced, independent or stand-alone chronographs were developed to measure transit time of a moving projectile. One such invention is described in U.S. Pat. No. 4,574,238. This alternate method utilizes an independent electronic chronograph to measure projectile velocity. As I understand it, photoelectric devices use ambient light or incandescent light to detect the projectile "shadow" as it passes along a predetermined measuring path through the two-stage chronograph window. An electronic circuit calculates projectile velocity based upon the "shadow" transit time and the known length of the chronograph window. As with the first technique, arrow velocity can only be conveniently measured when the arrow is released with the measuring device placed in front of the bow system, thereby eliminating collection of critical data pertaining to initial arrow motion or position.

This present invention provides the archer with the capability of quantifying the arrow position during its most critical point of travel: traversing the bow riser. With intimate mounting to the bow, the present invention delivers data on arrow dynamics not available with prior state-of-the-art designs.

OBJECTS AND ADVANTAGES

Accordingly, one feature of the present invention is an electronic measurement unit that can be mounted external to the bow riser. Various attachment mechanisms can be employed. A bracket assembly can be attached to the bow riser to provide convenient installation and removal. A doublesided adhesive tape can provide attachment between the electronic measurement unit and the bow riser. Yet another method would utilize the arrow rest plunger through-hole and bow sight mounting holes to attach the electronic measurement unit to the bow riser. One advantage of this feature is the ability to provide arrow position measurement in any shooting situation on many different bow configurations.

Another feature of this invention relates to mounting the electronic measurement unit internal to the bow riser. A machined or cast cavity to accommodate the electronic measurement unit can be placed in the bow riser during its manufacture. An advantage of this feature is the capability to permanently integrate a compact, reliable position measurement apparatus into a bow assembly.

Another feature of this invention relates to the utilization of an arrow feather or vane as an inexpensive trigger mechanism. An advantage of this feature is that the trigger mechanism requires no modification to the arrow shaft.

Another feature of this invention relates to the ability to mount the electronic measurement unit on a right-handed or left-handed bow.

Another feature of this invention relates to the determination of arrow position using a single sensor. A single optical sensor can provide a pulse width signal that is directly proportional to the arrow position. This feature has the advantage over a multiple sensor design due to the fact the bending moment on the arrow shaft can induce oscillations that prevent triggering along a collinear measuring path.

In accordance with another feature of the present invention, consecutive arrow position data can be stored in memory and conveniently recalled. A push-button assembly provides a mechanism to retrieve and display consecutive arrow position measurements, average arrow position, maximum arrow position, and minimum arrow position.

These and other features and advantages will be apparent in view of the detailed description and operation of the preferred and alternate embodiments that are referenced in the drawings provided.

SUMMARY

In accordance with the present invention, a low power, electronics measurement unit attached onto or mounted internal to a bow riser using an arrow feather or vane as an optical trigger mechanism for the purposes of measuring arrow position.

DETAILED DESCRIPTION AND OPERATION OF THE PREFERRED EMBODIMENTS

Figure 3:
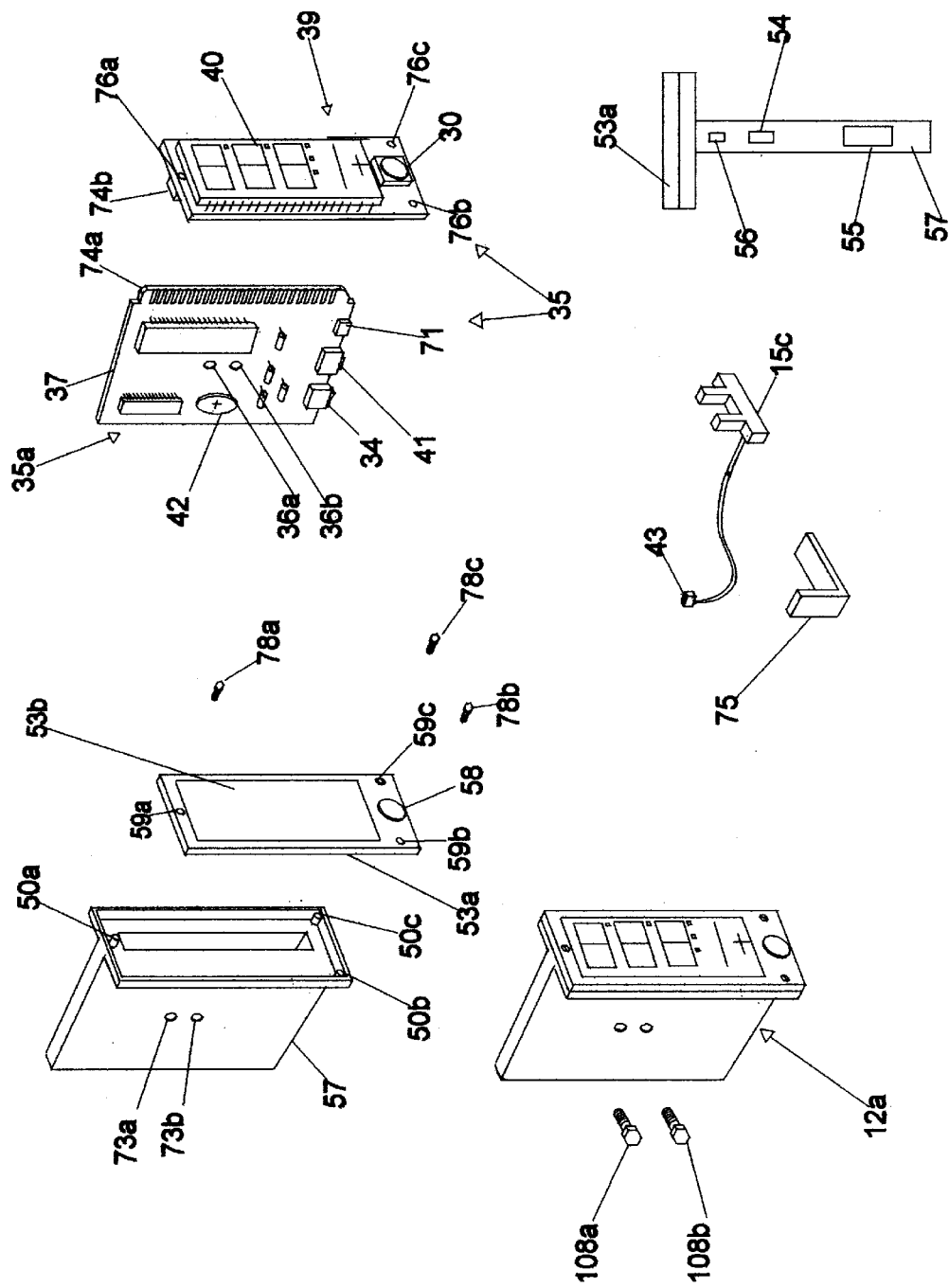
FIG. 3. A perspective view of the measurement unit with an [a] optical sensor cable-connector assembly.

A perspective view of a bow-mounted measurement unit is illustrated in FIG. 3. The bow-mounted measurement unit is a battery-powered electronic circuit that is designed to be mounted external to a bow riser. The measurement unit displays statistical parameters such as consecutive data, mean, maximum, and minimum arrow position through a user-selectable interface.

Figure 1A:
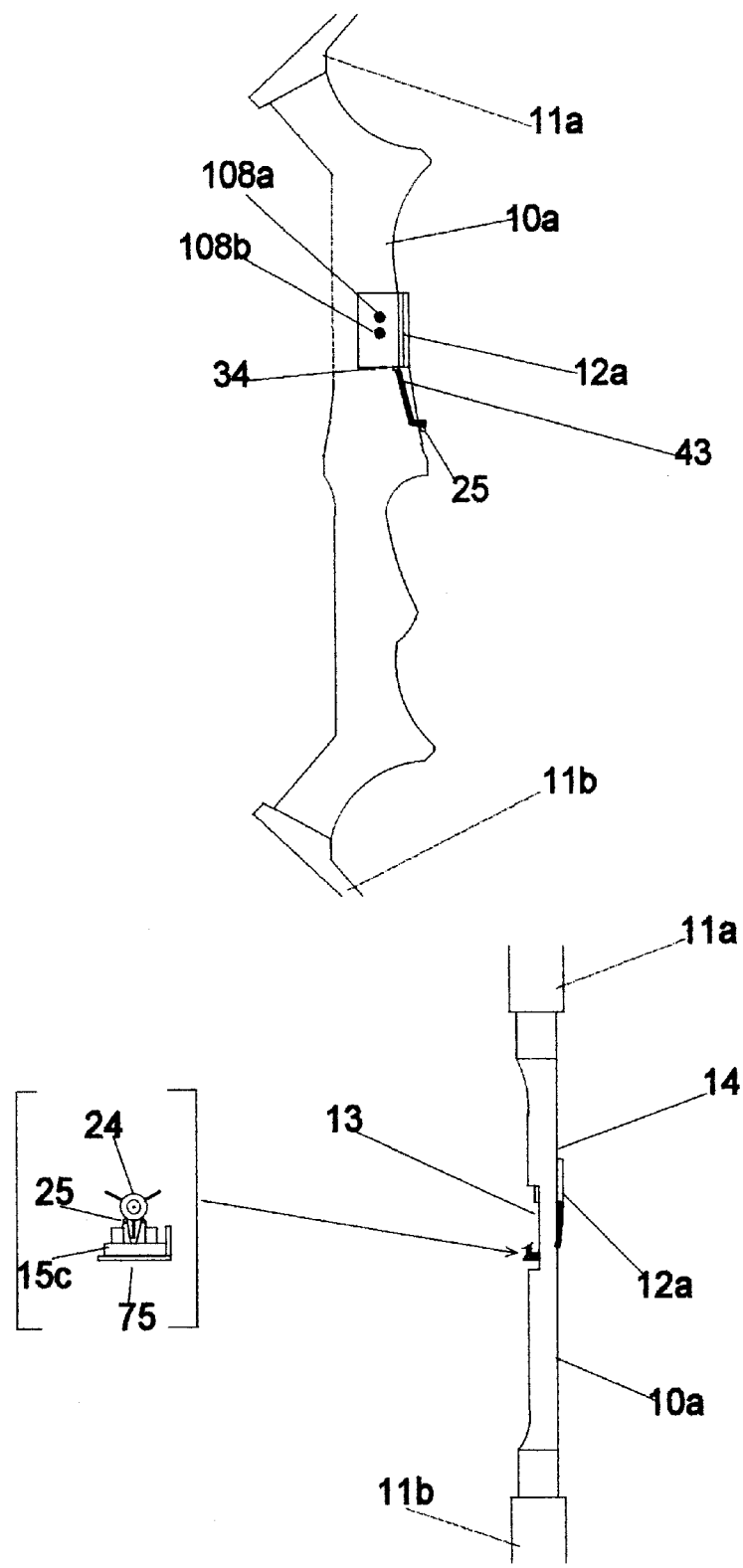
FIG. 1A. Side view and Front view of an external bow-mounted measurement unit installed on a left-handed bow with explode view of optical sensor.

All structural features are illustrated in FIG. 3. Bow-mounted measurement unit 12a is comprised of an injection molded plastic housing assembly 57, a bezel 53a, a display lens 53b and a electronics assembly 35. Bow-mounted measurement unit 12a also includes a optical sensor 15c that is responsive to the interruption of a path of radiant flux. Optical sensor 15c is comprised of a single emitter-detector pair indirect opposition such as the commercially available OMRON EE-SPY461. A sensor cable-connector assembly 43 connects a voltage source 42 to optical sensor 15c. Optical sensor 15c output is connected to bow-mounted measurement unit 12a through cable-connector assembly 43 via connector 71 through access hole 56. Electronics assembly 35 contains computational assembly 35a and display assembly 39. Computational assembly 35a attaches to display assembly 39 through edge connectors 74a and 74b. Electronics assembly 35 mounts in plastic housing assembly 57 and is retained by bezel 53a. Bezel 53a connects to plastic housing assembly 57 by three screws 78a, 78b, and 78c. Screws 78a, 78b, and 78c connect to mounting bosses 50a, 50b, and 50c through mounting holes 59a, 59b, and 59c in bezel 53a and through mounting holes 76a, 76b, and 76c in display assembly 39. Optical sensor 15c attaches to bow riser 10a with bracket 75 as illustrated in FIG. 1A. Bracket 75 attaches to bow riser 10a with double-sided adhesive tape 75b.

Bow-mounted measurement unit 12a mounts to bow riser 10a with mounting bolts 108a and 108b using conventional bow sight mounting holes via mounting holes 73a and 73b in plastic housing assembly 57 and mounting holes 36a and 36b in computational assembly 35a. Bow-mounted measurement unit 12a has ambidextrous mounting capability. FIG. 1A identifies an inboard side 13 and an outboard side 14 to bow riser 10a. As previously mentioned, bow riser 10a is a left-handed version. To attach bow-mounted measurement unit 12a externally on a right-handed bow riser, characteristically identify inboard 13 and outboard 14 side from FIG. 1A on a right-handed bow riser and mount as previously described. The electronic schematic for computational assembly 35a is illustrated is FIG. 5A. Computational assembly 35a contains a microcontroller or microprocessor 84. Microcontroller 84 contains internal timer-capture hardware or cascaded counter circuit, interrupt circuitry, bi-directional input and output lines, and memory required to interface to the hardware disclosed in the present invention. Microcontroller 84 connects to a display driver 85 through interface lines 89 placed upon a printed wiring board 37. A display driver 85 contains the necessary timing and interface circuitry to control a display 40. Display driver 85 connects to a display 40, such as an LCD, on display assembly 39 through interface lines 90. From sensor cable-connector assembly 43 in FIG. 3, optical sensor 15c interfaces to timer-capture interrupt circuit internal to microcontroller 84 through interface 88a. Optical sensor 15c has an open collector output pulled-up through a resistor to the power rail. Microcontroller 84 and display driver 85 connect to a power switch 34 through lines 81a. Optical sensor 15c connects to power switch 34 through line 107. Power switch 34 connects to a battery-power supply 42 through connection 81b.

As illustrated in FIG. 3, power switch 34 access is made available through access hole 55 in plastic housing assembly 57. An oscillator 82 provides an electronic time base for microcontroller 84 through line 83. A mode-select momentary push-button switch 41 connects to an interrupt pin on microcontroller 84 through line 93. Access to mode-select switch 41 occurs through access hole 54 in plastic housing assembly 57. A reset momentary push-button switch 30 connects to the microcontroller 84 through line 94. Access to reset switch 30 occurs through access hole 58 in bezel 53a.

Figure 2B:
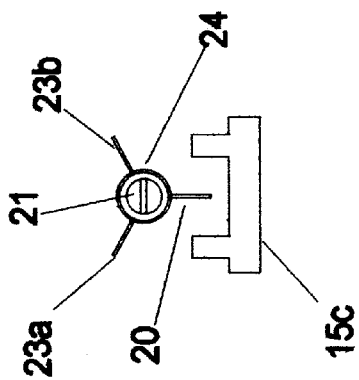
FIG. 2B. End view of a three feather(vane) arrow with a optical sensor in proper orientation.
Figure 2A:
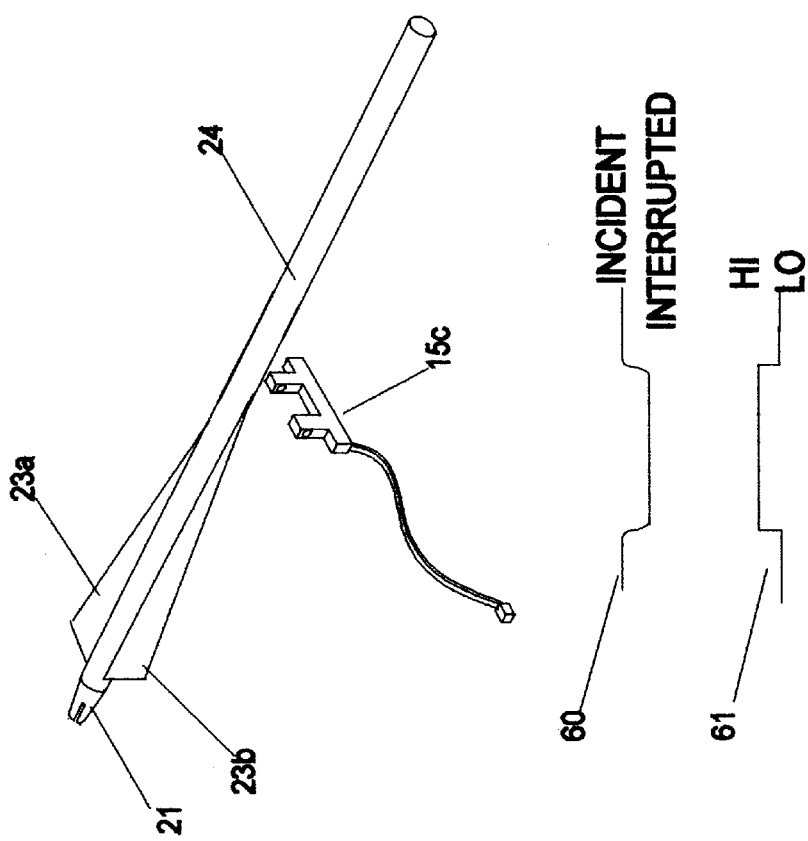
FIG. 2A. A perspective view of an arrow shaft with an optical trigger installed and its associated optical flux and optical sensor electrical characteristics.
Figure 5A:
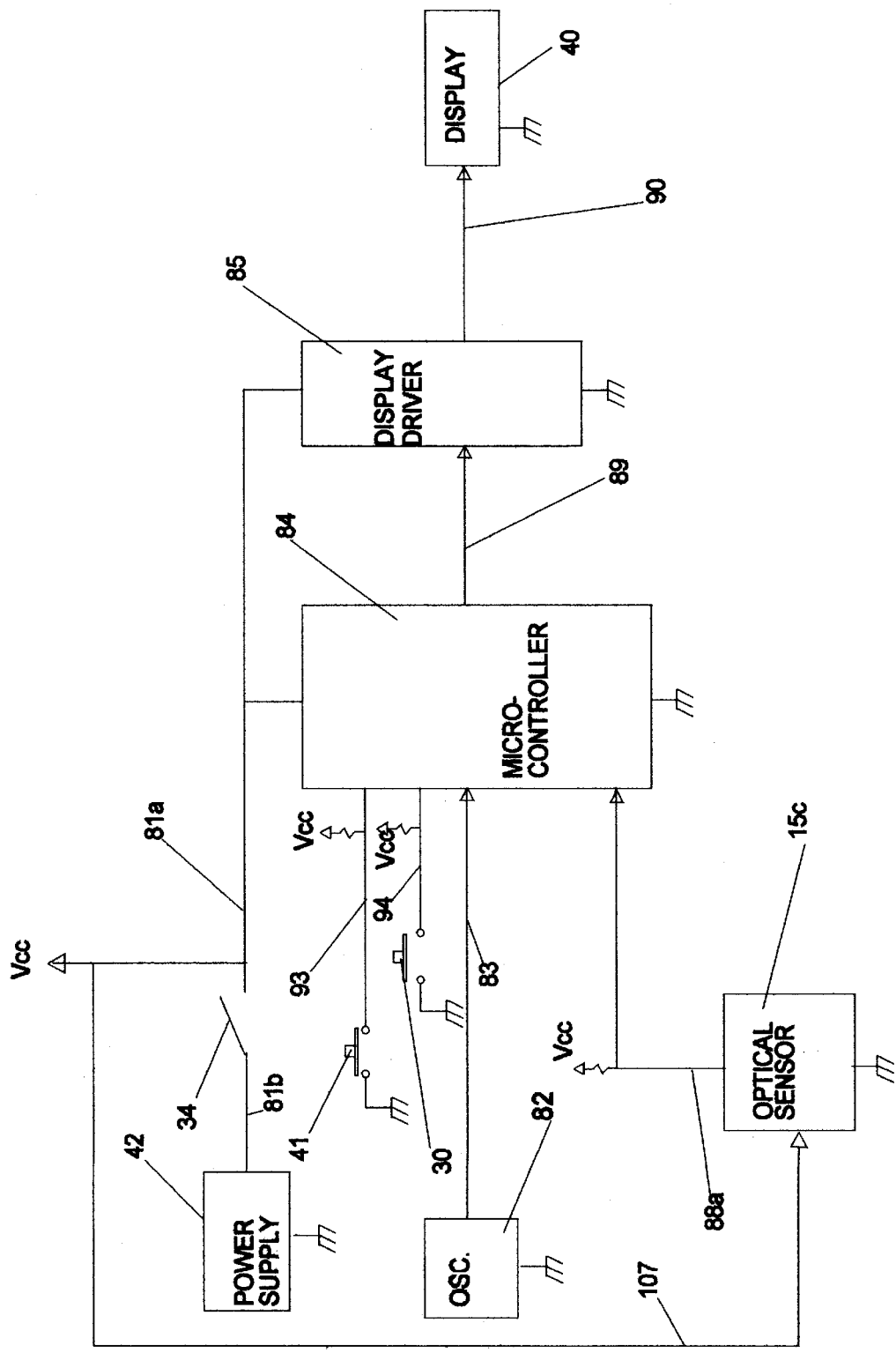
FIG. 5A. A schematic of an electronic circuit to measure arrow position using embedded controller internal hardware.

All electronic components are connected to a common reference as indicated in FIG. 5A. The optical trigger mechanism is illustrated in FIG. 2A. The location of the optical sensor for a three feather (vane) arrow is shown in FIG. 2B. For a three feather arrow, optical sensor 15c is placed around "cock" feather 20. Conventionally, "cock" feather 20 can be identified as the odd colored feather. "Cock" feather 20 functions as the optical trigger mechanism. The remaining "hen" feathers 23a and 23b are positioned directly above optical sensor 15c.

Figure 1B:
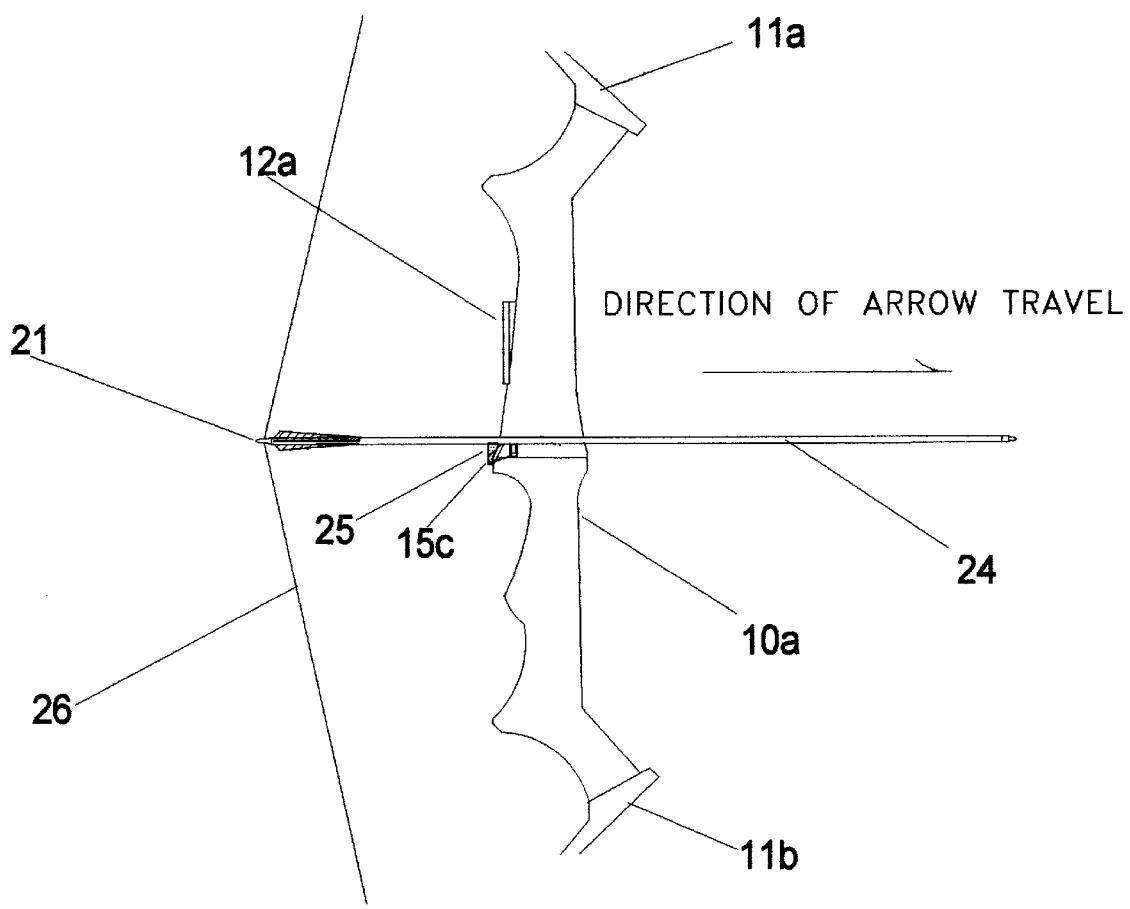
FIG. 1B. Side view of a left-handed bow and arrow in operation with an external bow-mounted measurement unit installed.
Figure 4A:
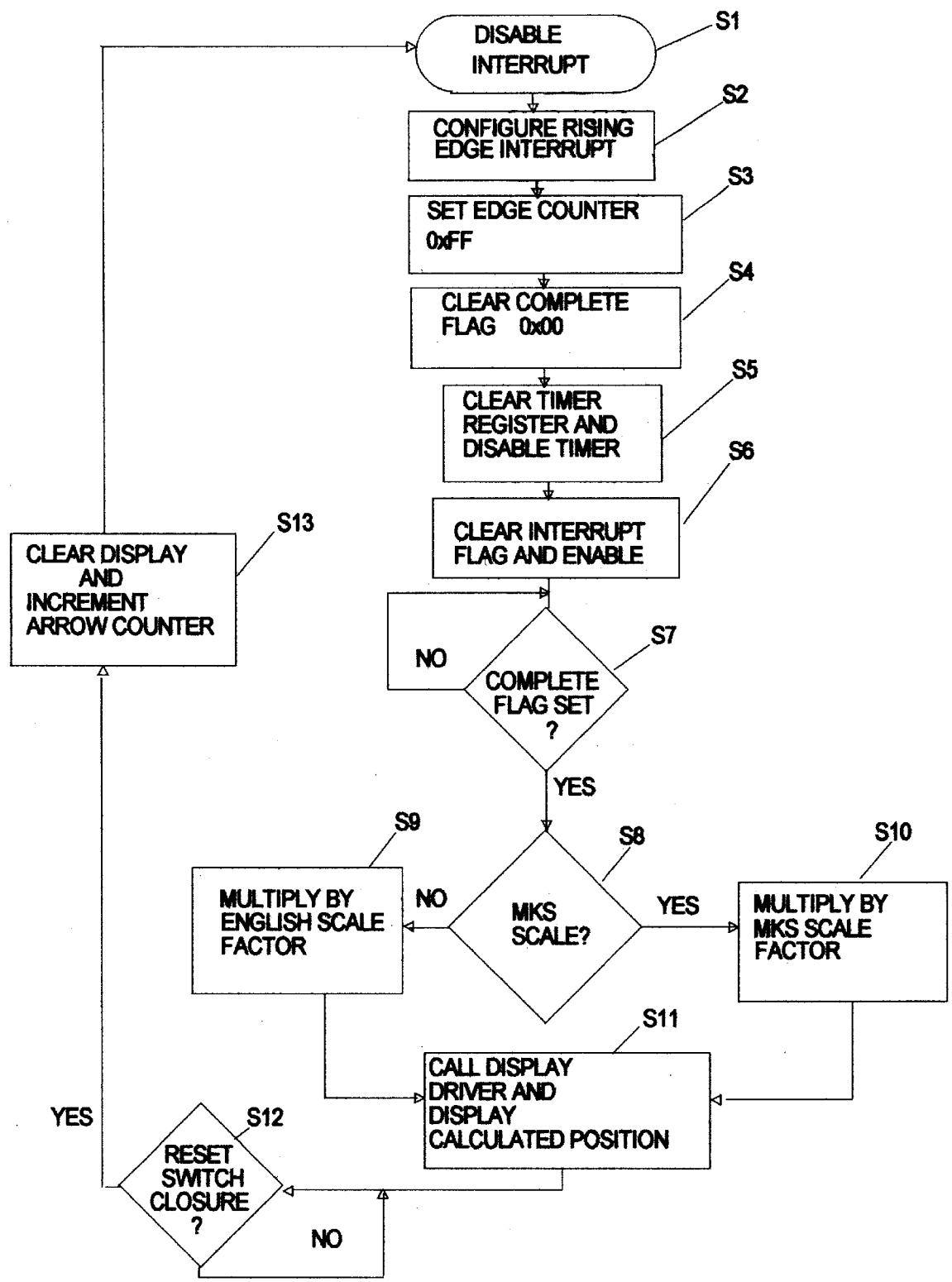
FIG. 4A. A software flowchart for arrow position measurement using an embedded controller.

The preferred embodiment uses a very simple method to determine arrow position. By utilizing cock feather 20 as a trigger mechanism, bow-mounted measurement unit 12a determines a pulse width, via electronic time base, that is directly proportional to the length of the aforementioned trigger mechanism. A user configurable gain or scale factor provides a sensitivity adjustment for the position measurement. Depending on the skill of the archer, the multiplicative scale factor can amplify or attenuate the displayed deviations, thus allowing the archer to achieve higher levels of excellence in bow system performance. The operation of the preferred embodiment of this invention is illustrated in FIG. 1B. An arrow shaft 24 is connected to a bow string 26 by a nock 21 attached to the end of the arrow. The archer draws bow string 26 away from the bow riser 10a. The potential energy stored in bow limbs 11a and 11b is converted to kinetic energy when the archer releases bow string 26. The kinetic energy swiftly accelerates arrow shaft 24 past bow-mounted measurement unit 12a along an arrow rest 25. As indicated in FIG. 1A, optical sensor 15c is placed underneath traveling arrow shaft 24 by bracket 75. Optical trigger mechanism 20 passes through optical sensor 15c and interrupts the transmitted and detected radiant energy. As I understand it, interrupted radiant energy produces a voltage change in the output of optical sensor 15c. As shown in FIG. 2A, optical sensor 15c generates square pulse waveform 61 from interrupted radiant energy waveform 60 via Schmitt Trigger. Pulse waveform 61 is a voltage waveform connected to an internal timer counter circuit in microcontroller 84 via connection 88a. As those skilled in the art recognize, commercially available microcontrollers, such as a PIC16C62 from Microchip Technology, Inc. of Chandler, Arizona, have internal counters with a time base derived from the internal system clock. External events enable and disable these counters thereby providing a proportional count or measurement of the event. As vertical and horizontal oscillations in arrow shaft 24 occur, the length of the optical trigger mechanism 20 presented to optical sensor 15c varies. These position variations induce changes the proportional count and are therefore indicative of displacement magnitude. The input to the internal timer circuit is an interrupt. A software program determines microcontroller 84 response to the interrupt. A flowchart detailing program flow is shown in FIG. 4A.

Figure 4B:
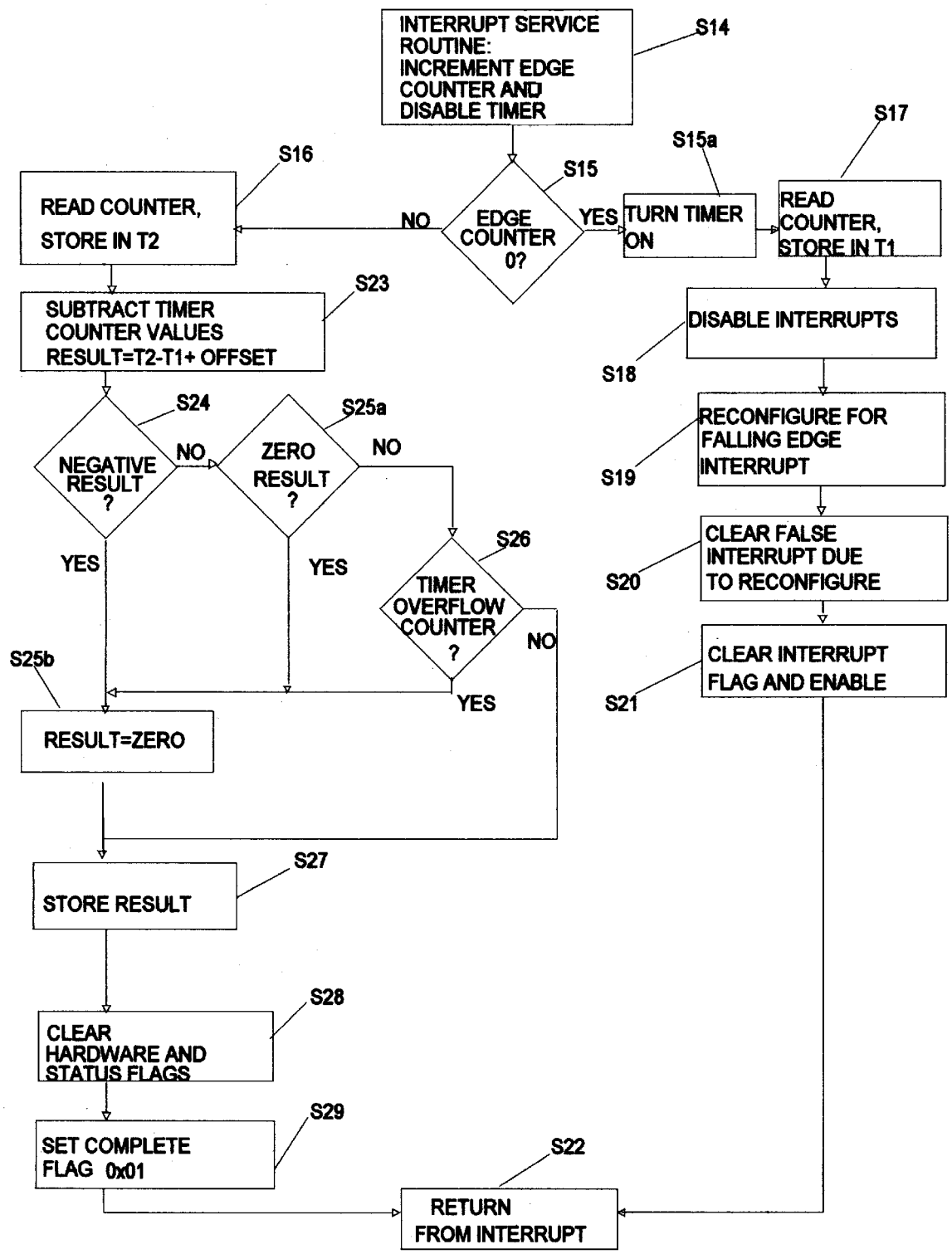
FIG. 4B. A software flowchart for an interrupt service routine for arrow position measurement using an embedded controller.

Upon closure of the power switch 34, microcontroller 84 is reset and all program variables and hardware are set to a known condition. During initialization, step S1 and S2 disable the interrupt and configure the interrupt hardware to respond to a rising edge external event. Step S3 through S6 set event counters to predetermined values and enable the interrupt circuitry. The main software program enters a wait loop at step S7 until the external event initiated by passing arrow shaft 24 and trigger mechanism 20 occurs. The transition of pulse waveform 61 from a logic LO to a logic HIGH constitutes a rising edge as illustrated in FIG. 2A. This event forces program execution to proceed to step S14 in FIG. 4B. At step S14, the EDGE COUNTER is incremented from hexadecimal 0xFF to 0x00 and the internal timer is disabled or turned-off Step S15 is a conditional branch. If the EDGE COUNTER is 0x00 then the external event is known to be a rising edge or the leading edge of the pulse waveform 61. The internal timer is enabled as step S15a. Step S17 reads the counter value from the internal timer and stores the value in memory. Step S18 disables the edge detect interrupt. At step S19, the interrupt hardware is reconfigured to vector on a falling edge or trailing edge of the pulse waveform 61 from the optical sensor 15c. The internal flag for active interrupts is cleared and reenabled at step S20 and S21 and the interrupt service routine is exited at step S22 with a return to execution at the wait loop in step S7. As arrow shaft 24 proceeds past optical sensor 15c, optical trigger 20 induces the falling edge of pulse waveform 61 and the interrupt service routine in FIG. 4B is entered a second time.

Step S14 increments the EDGE COUNTER and turns off the internal timer. The conditional branch at step S15 again determines the nature of the edge of pulse waveform 61. The edge induced by optical trigger 20 is the trailing edge of waveform 61, therefore step S16 is executed next. The counter value is read from the internal timer and stored. Next, step S23 subtracts the previous timer value from the value just acquired in step S16. An offset is added to the derived transit time to compensate for timer enable-disable lag. To ease software requirements, the counter word width, such as a 16 bit counter, oscillator 82 frequency, and optical trigger length are selected to ensure that the maximum transit time will not induce a counter overflow during a valid measurement. If the internal timer is not implemented in such a manner, then microcontroller 84 software must consider internal timer counter overflows. A conditional branch at step S24 checks the underflow status. Steps S25 through S26 provide counter value restoration. Step S27 stores the transit time sequentially in memory. Finally, step S28 clears the hardware and status flags in preparation for the next arrow velocity or arrow position measurement Step S29 sets the COMPLETE FLAG and step S22 returns program execution to the main program at step S7. The set COMPLETE FLAG passes execution to a conditional branch step S8. Step S8 applies the multiplicative scale factor selected by the user. MKS scaling factor is 25.4. English scale factor is 1.0.

If MKS scaling was chosen by the user, step S10 is executed, else step S9 is executed. Step S11 passes the calculated arrow position to the display driver routine. Microcontroller 84 transmits the display data to display driver 85 through interface 89. Display Driver 85 contains the required hardware timing and interface requirements to control display 40. The display driver routine is exited and program flow returns to the main program. At step S12, another wait loop is entered until the archer depresses momentary push-button switch 30. The external event detected by step S12 through software input pin polling returns execution to step S13 where the display is cleared and the ARROW COUNTER incremented. Step S1 is reentered and the initial configuration of the internal hardware is set to prepare bow-mounted measurement unit 12*a* for another arrow position measurement.

Figure 4C:
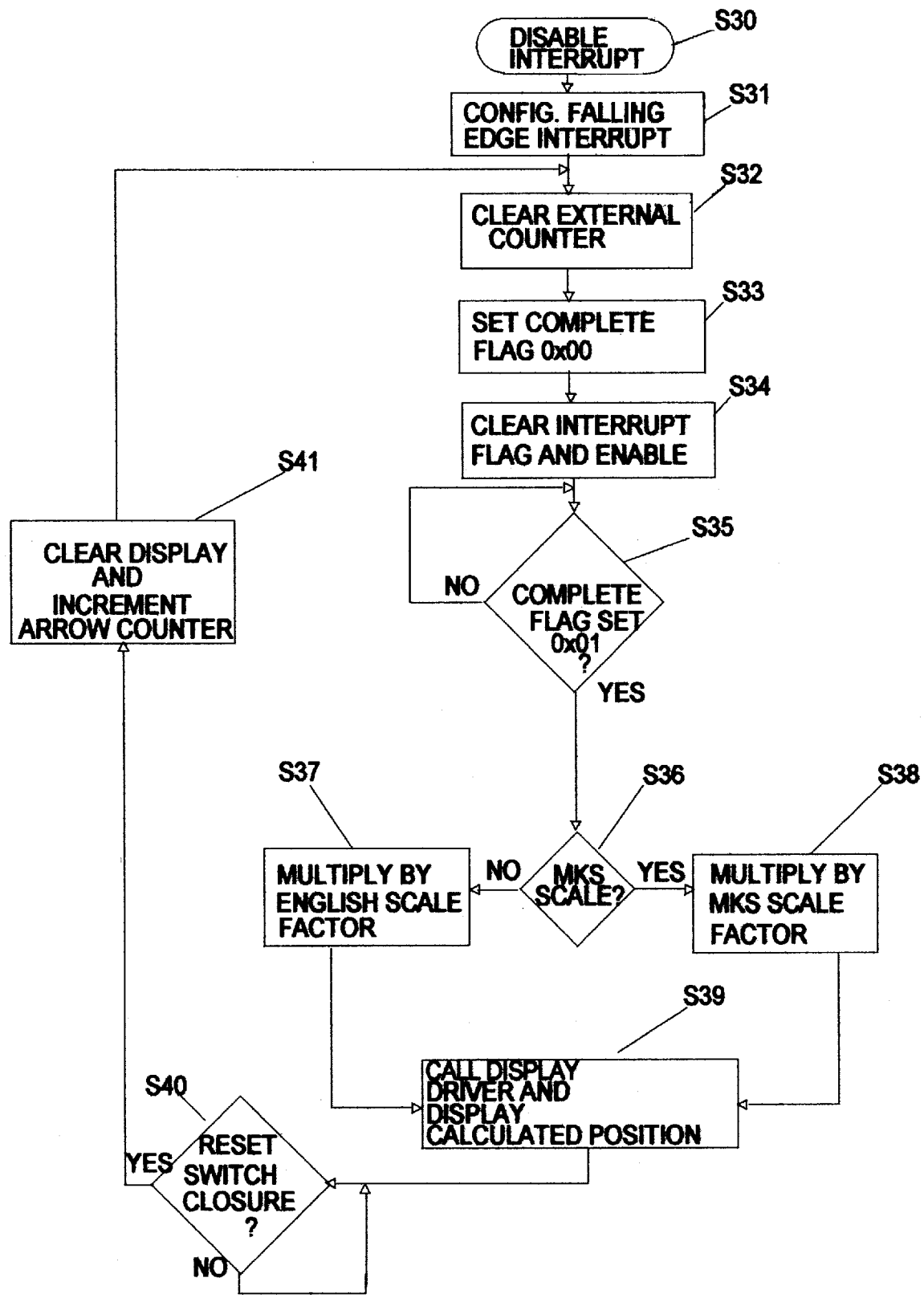
FIG. 4C. A software flowchart for arrow position measurement using an external counter circuit.
Figure 4D:
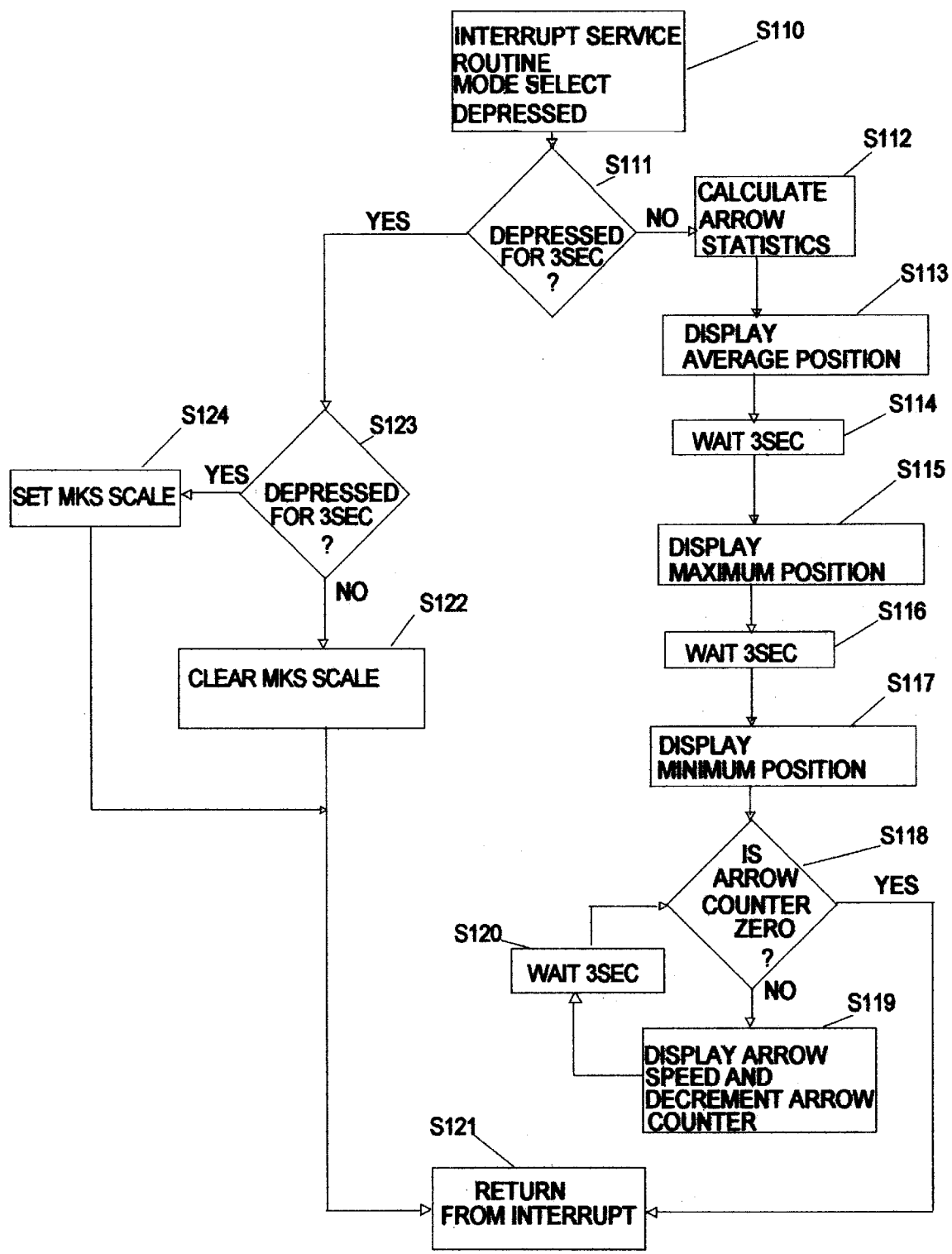
FIG. 4D. A software flowchart for an interrupt service routine for reading a mode-select switch.

For the archer to activate features available through mode-select switch 41, the momentary push-button must be depressed. As the output from switch 41 transitions low an interrupt is triggered through connection 93 to microprocessor 84. FIG. 4D illustrates the interrupt service routine operation after vectoring from the main program. Step S110 is the entry point of the interrupt service routine. A conditional branch at step S111 determines the depression time of mode-select switch 41. If mode-select switch 41 is depressed for less than three seconds, arrow position statistics are displayed. If mode-select switch 41 is depressed for more than three seconds, the unit scaling branch is executed. To display arrow position statistics, step S112 retrieves the current consecutive arrow position measurements from microcontroller 84 memory and calculates the average position, the maximum position, and the minimum position. Next, steps S113 through S117 call the display driver and display the arrow position statistics with a three second interval between updates. At step S118, a conditional branch determines if the ARROW COUNTER is zero. For the first iteration of this display loop, the arrow counter is equivalent to the total number of arrows released since the last statistical display. The maximum number of arrow position recordings is determined by available memory in microcontroller 84 and has been established at twelve for the preferred embodiment. Step S119 calls the display driver and presents consecutive arrow position via loop S118–S120. Upon completion of consecutive arrow position presentation, step S121 is executed and control is returned to the main program. Consequently, if mode-select switch 41 is depressed for at least three seconds, the unit scale branch executes. If mode-select switch 41 is depressed for an additional three seconds, step S123 branches execution to step 124 to set flag MKS SCALE else flag MKS SCALE is cleared in step S122. Again, step S121 is sequentially executed and control is returned to the main program.

DETAILED DESCRIPTION AND OPERATION OF THE ALTERNATE EMBODIMENTS

Figure 1C:
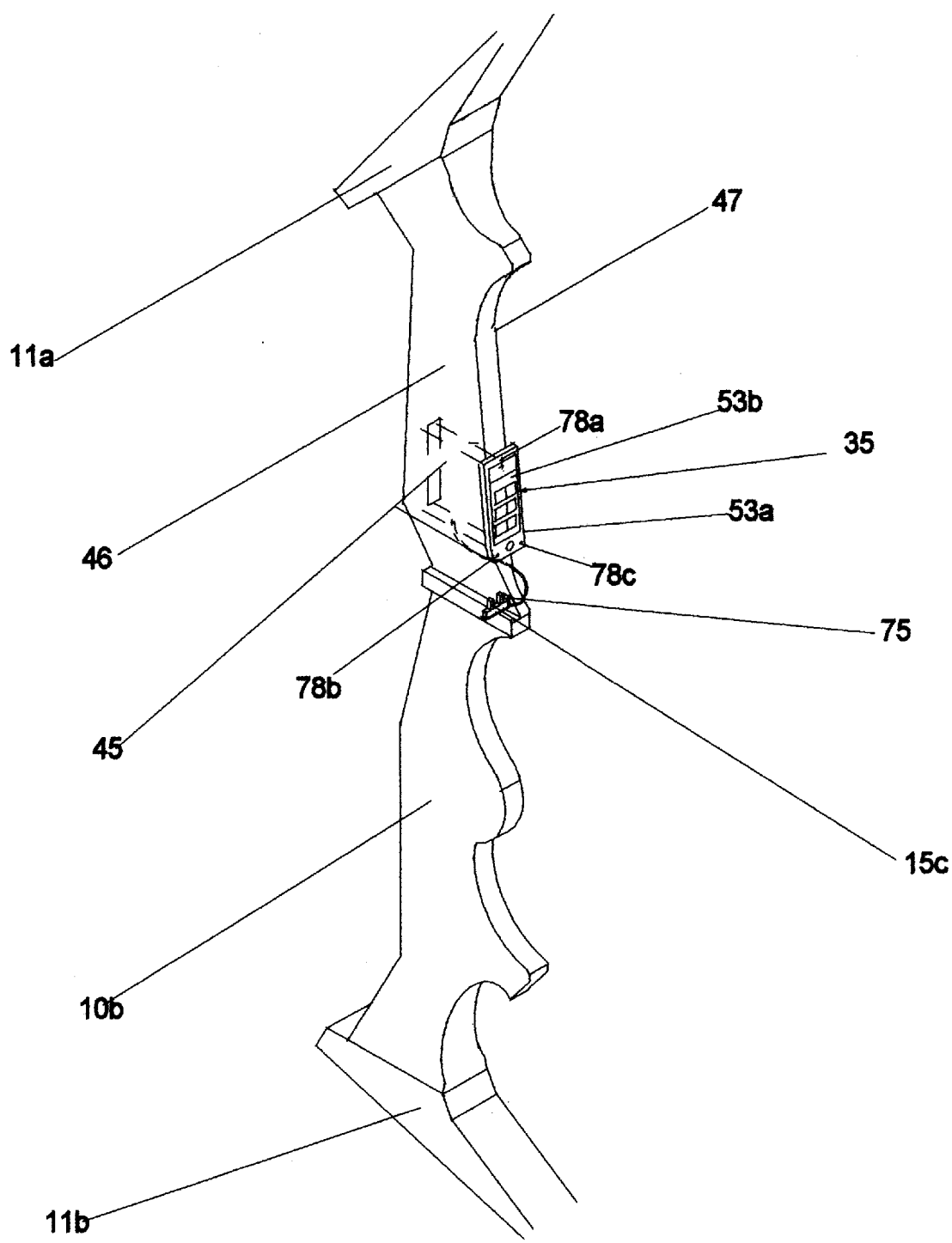
FIG. 1C. Perspective view of an internal bow-mounted measurement unit installed on a right-handed bow.

An alternate embodiment relies on the same electronic design described in the preferred embodiment with minor modifications to the structural implementation. During the manufacture of a bow riser 10*b* a cast or machined cavity 45 with mounting holes is designed to accommodate electronics assembly 35 as shown in FIG. 1C. Reference numerals 46 and 47 identify the inboard and outboard side of right-handed bow riser 10*b*, respectively. Electronics assembly 35 is attached to bow riser 10*b* by using bezel 53*a*, lens 53*b*, and attachment screws 78*a*, 78*b*, and 78*c*.

Figure 4E:
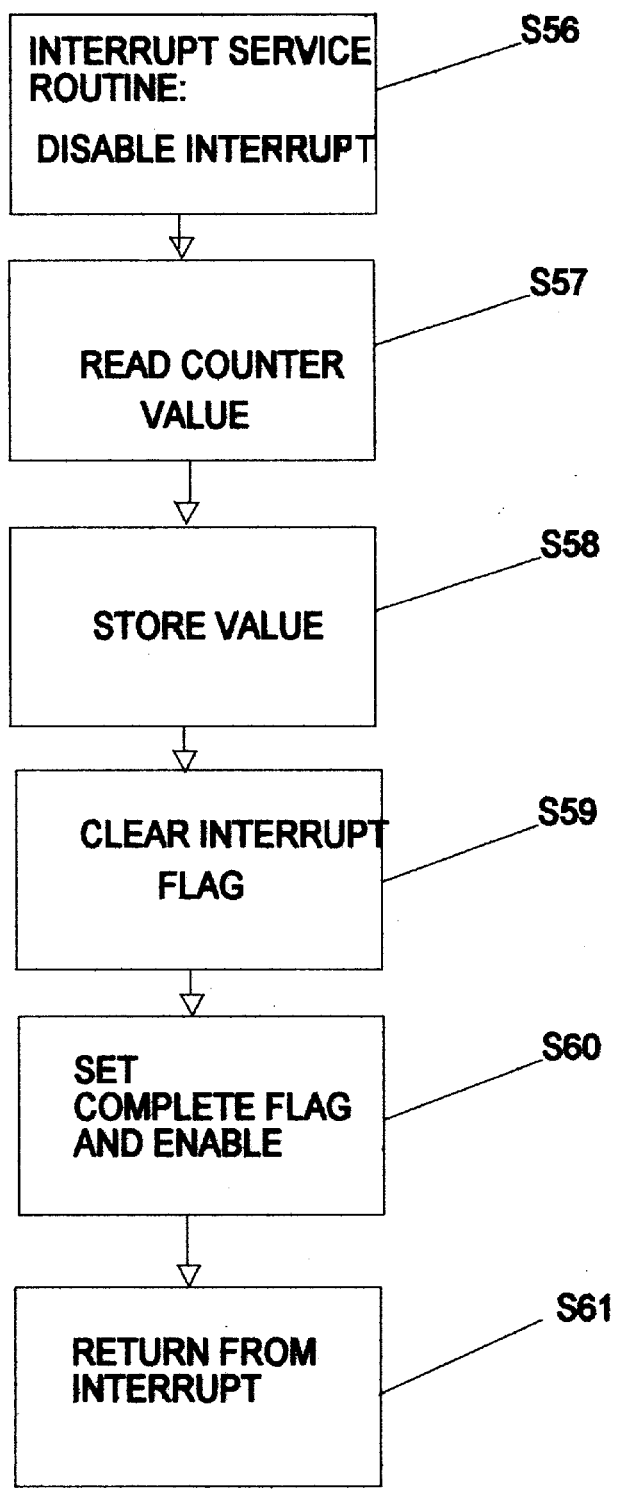
FIG. 4E. A software flowchart for an interrupt service routine for arrow position measurement using an external timer circuit.
Figure 4F:
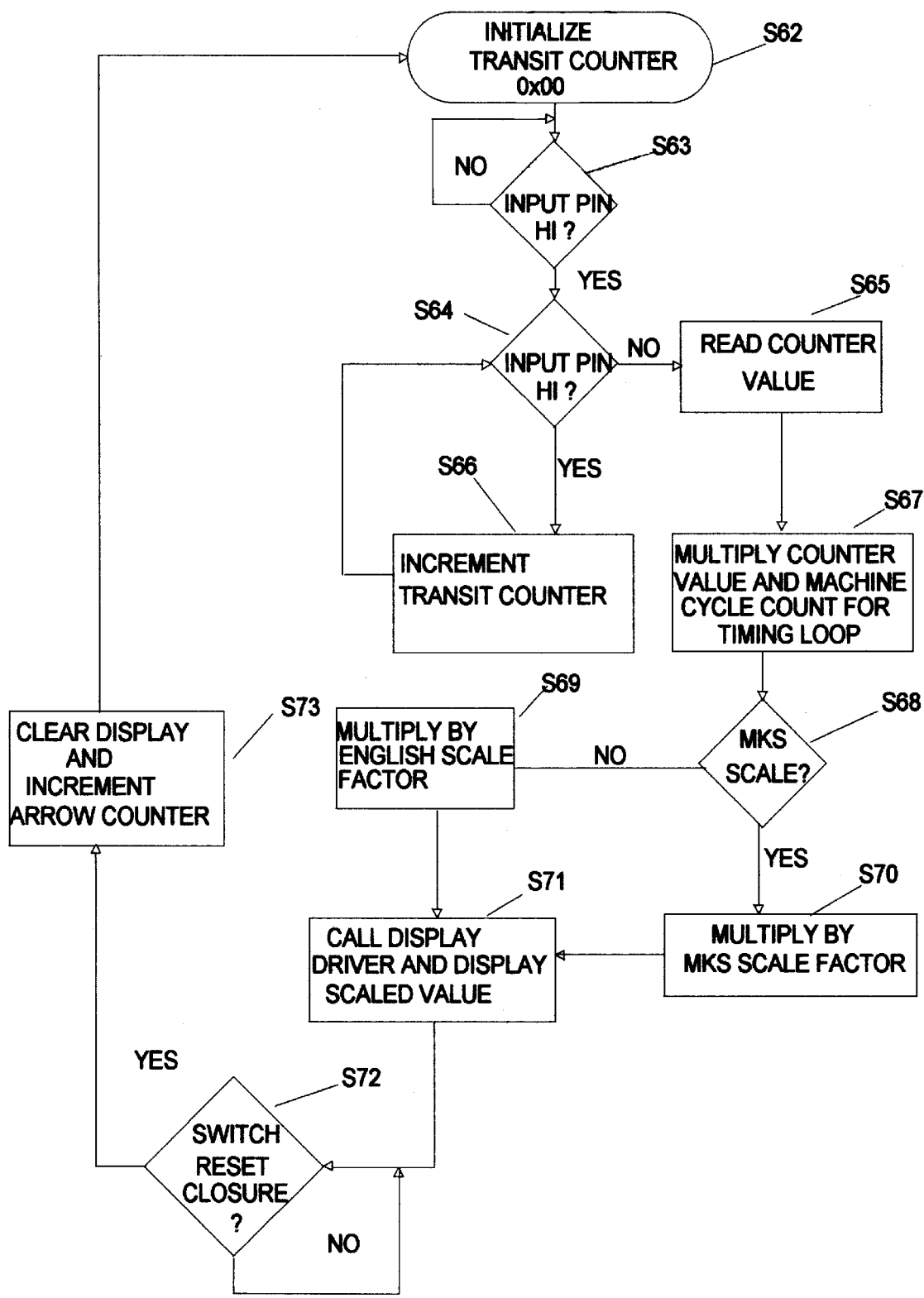
FIG. 4F. A software flowchart for arrow position measurement using a software timing loop.

Another alternate embodiment relies on the same structural and electronic design described in the preferred embodiment with minor modifications to the software as shown in FIG. 4F. Pulse waveform 61 is generated as described in the preferred embodiment. In this alternate embodiment, microcontroller 84 polls optical sensor 15*c* through interface line 88*a*. Step S62 initializes the TRANSIT COUNTER to 0x00. A wait loop at step S63 determines if optical trigger 20 has passed by optical sensor 15*c*. If this leading edge event has occurred, step S64 determines the minimum width by a conditional branch. If the input pin is no longer a logic HI, the arrow position either exceeded the resolution of this embodiment or a glitch occurred. A reading of zero arrow position will result. If the input is maintained at a logic HI, the timing loop continues to count the event at step S66. The passing of optical trigger 20 forces software execution to step S65 where the TRANSIT COUNTER is read. To determine the transit time, the TRANSIT COUNTER is multiplied by the machine cycle count for timing loop S64 and S66 in step S67. Next, conditional branch S68 determines the unit scale factor to use and advances through either step S69 or step S70. Step S71 displays the derived value and a reset wait loop is entered at step S72. A closure of push-button switch 30 advances program execution to step S73 where the display is cleared and the ARROW COUNTER is incremented. Finally, step S62 is reentered for another measurement sequence.

Figure 5B:
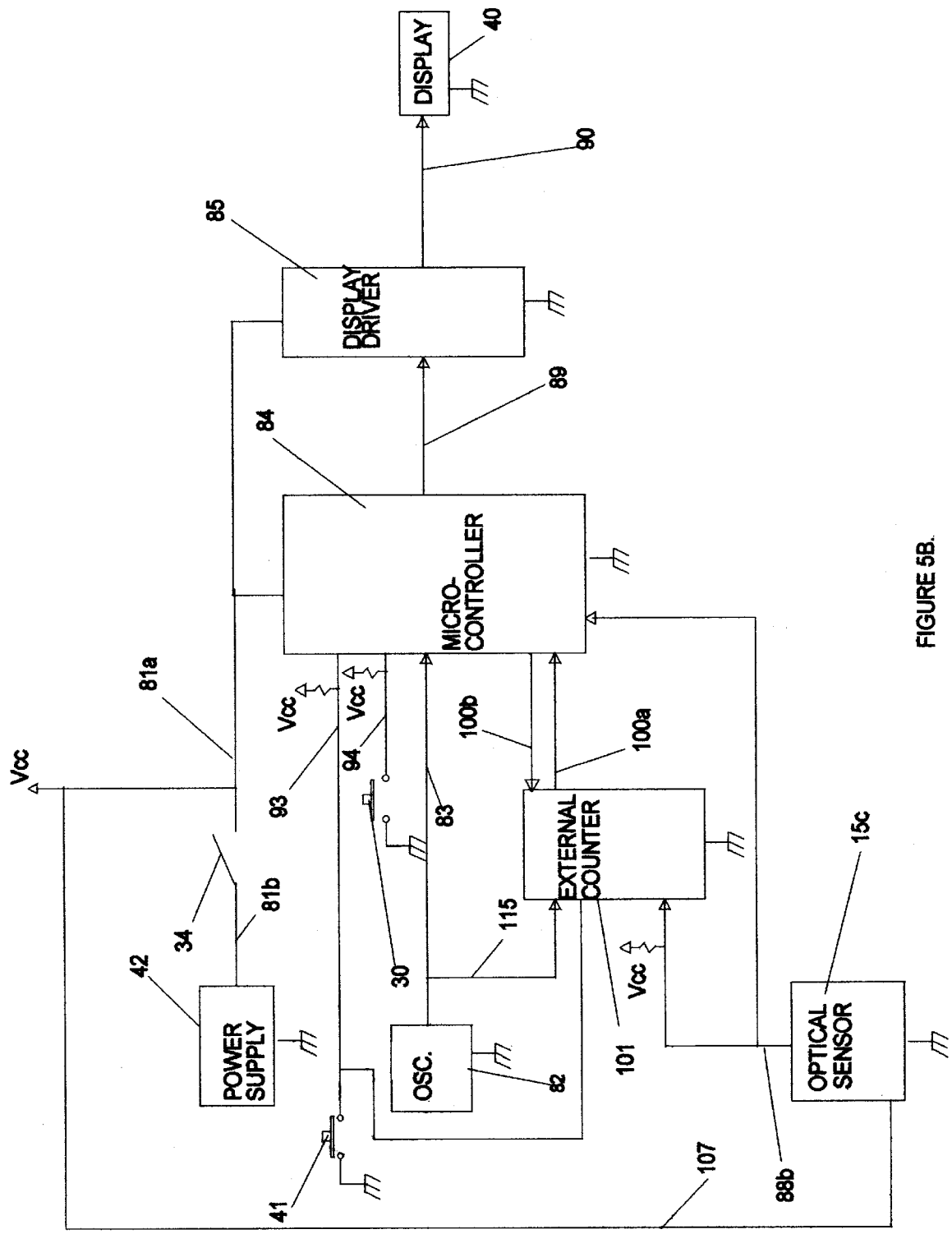
FIG. 5B. A schematic of an electronic circuit to measure arrow position using an external circuit.

Yet another alternate embodiment relies on the same structural design described in the preferred embodiment with modifications to the hardware as shown in FIG. 5B. This alternate embodiment also requires modifications to bow-mounted measurement unit 12*a* software as illustrated in FIG. 4C. The output of optical sensor 15*c* is connected through line 88*b* to the enable or inhibit count pin of an external counter circuit 101. External counter circuit 101 is connected to microcontroller 84 through interface 100*a* and 100*b* and is also connected to oscillator 82 by line 115. As previously described in the preferred embodiment, optical trigger 20 passes optical sensor 15*c* and generate pulse waveform 61 In this embodiment, pulse waveform 61 enables external counter 101. External counter 101 receives its time base from free-running oscillator 82. Pulse waveform 61 enables or permits external counter 101 to increment its count from its reset value to a new value, proportional in time, to the pulse width generated by optical trigger 20 which is directly proportional to the position of arrow shaft 24. Optical sensor 15*c* creates an interrupt signal to alert microcontroller 84 that a measurement cycle is complete. FIG. 4C and FIG. 4E illustrates microcontroller 84 response to these external events.

Step S30 and S31 disable the interrupt and set microcontroller 84 interrupt activation to the trailing edge of pulse waveform 61. Step S32 resets external counter to a known state through interface 100*b*. Steps S33 and S34 clear the execution flags and enable the interrupt circuitry for an external event. A wait loop is entered in step S35 until optical trigger 20 creates the external timing event. Upon detection of the interrupt, microcontroller 84 enters an interrupt service illustrated in FIG. 4E. Step S56 disables the interrupt circuitry and external counter 101 output value is read from interface 100*a* in step S57. The counter value is stored sequentially into memory in step S58. The interrupt service routine clears the interrupt flag at step S59, sets the COMPLETE FLAG and enables the interrupts at step S60 and returns program execution in step S61. A conditional branch at step S35 passes program execution to S36 once the COMPLETE FLAG is set. The conditional branch at step S36 determines whether to apply MKS scaling in step S38 or the English scaling in step S37. Following the multiplicative scale factor application, step S39 executes a call to the display driver routine to convert the scaled number to a display value and writes to display 40 as explained in the preferred embodiment. Sequentially, step S40 monitors momentary push-button switch 30 to reset or clear display 40. Upon closure of switch 30, program execution proceeds to step S41 to clear display 40, increment ARROW COUNTER, and resume execution at step S32 to prepare for another external event.

Numerous configurations have been demonstrated in the previous paragraphs. As apparent to those skilled in the art, various modifications and substitutions may be made to the techniques and structures disclosed herein without departing from the spirt and scope of the following claims. Consequently, it should be understood that the device and methods described herein are illustrative only and are not limiting upon the scope of the present invention.

What is claimed is:

1. An apparatus directly coupled to a bow for dynamically quantifying arrow position, said apparatus comprising:
    a) a sensor comprising an optical emitter and a detector for detecting and communicating data pertaining to arrow position, and
    b) an optical trigger mechanism integral to an arrow shaft, and
    c) an electronics assembly for receiving, processing, and displaying said data, and
    d) a wire assembly to place said sensor in communication with said electronics assembly, and
    e) a mounting bracket for holding said sensor to a bow, and
    f) a housing for holding said electrons assembly to said bow, whereby said optical trigger mechanism interrupts a signal transmitted between said optical emitter and detector to generate data used to detect or improve archery tackle performance.

2. The apparatus of claim 1 wherein said electronic assembly is mounted in an internal cavity in said bow.

3. The apparatus of claim 1 wherein said electronics assembly uses an external counter circuit to collect said data.

4. The apparatus of claim 1 wherein said apparatus utilizes an arrow feather or vane as a optical trigger mechanism.

5. The apparatus of claim 1 wherein said apparatus can be mounted on a right-handed or left handed bow.

6. An apparatus directly coupled to a bow for dynamically quantifying arrow positions, said apparatus comprising:
    a) a sensing means comprising an optical emitter and detector for detecting and communicating data pertaining to arrow position, and
    b) means for receiving, processing, and displaying said data, and
    c) means to place said sensing means in communication with said processing means, and
    d) means for holding said apparatus to a bow, and
    e) an optical trigger mechanism integral to an arrow shaft, and whereby said optical trigger mechanism interrupts a signal transmitted between said detecting means to generate data used to detect or improve archery tackle performance.

7. The apparatus of claim 6 wherein said apparatus is mounted in an internal cavity in said bow.

8. The apparatus of claim 6 wherein said apparatus can be mounted on a right-handed or left handed bow.

* * * * *